United States Patent [19]

Tiittanen

[11] Patent Number: 5,133,879
[45] Date of Patent: Jul. 28, 1992

[54] FILTERING PROCEDURE USING A BOX FILTER AND REMOVING CAKE THEREFROM

[75] Inventor: Kyosti Tiittanen, Lappeenranta, Finland

[73] Assignee: Larox Oy, Lappeenranta, Finland

[21] Appl. No.: 652,708

[22] Filed: Feb. 1, 1991

[63] Related U.S. Application Data

Continuation at PCT/FI89/00132 Jul. 7, 1989, abandoned.

[30] Foreign Application Priority Data

Aug. 3, 1988 [FI] Finland .................. 883630

[51] Int. Cl.⁵ ............................ B01D 25/32
[52] U.S. Cl. .................. 210/770; 210/224; 210/225; 210/768; 210/771
[58] Field of Search .............. 210/768, 769, 770, 771, 210/224, 225, 767, 791, 108; 100/113, 115, 127, 177, 196, 198

[56] References Cited

U.S. PATENT DOCUMENTS 3,347,383 10/1967 Augerot .................. 210/225
3,503,326 3/1970 Juhasz et al. ............ 210/225
4,900,454 2/1990 Hedlund et al. ........... 210/225

FOREIGN PATENT DOCUMENTS 1118383 4/1967 United Kingdom .

Primary Examiner—W. Gary Jones
Assistant Examiner—Sun Uk Kim
Attorney, Agent, or Firm—Darby & Darby

[57] ABSTRACT

The invention concerns a filtering procedure by which the solid matter and the fluid contained in a sludge are separated in a box filter. The sludge is passed in the filter into a filtering space (2) between two opposite filter cloths (3), where the fluid is separated, whereupon the cake (13) of solid matter produced is dried by passing a stream of air through it. The essential feature of the invention is that the drying is performed by passing a stream of air into the cake (13) first from one side and then from the opposite side of the filtering space (2) in such manner that the air flows in opposite directions through the cake during these drying phases. Penetrating through the filter cloth (3) into the cake, the air causes the cake to be detached from the cloth. When the filtering space is opened, the cake thus detached and dried can be removed directly without specific detaching efforts.

14 Claims, 2 Drawing Sheets

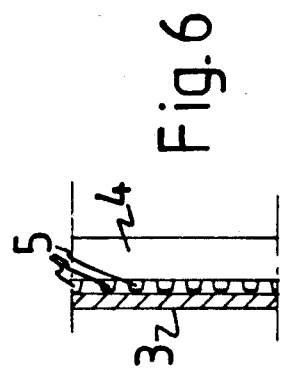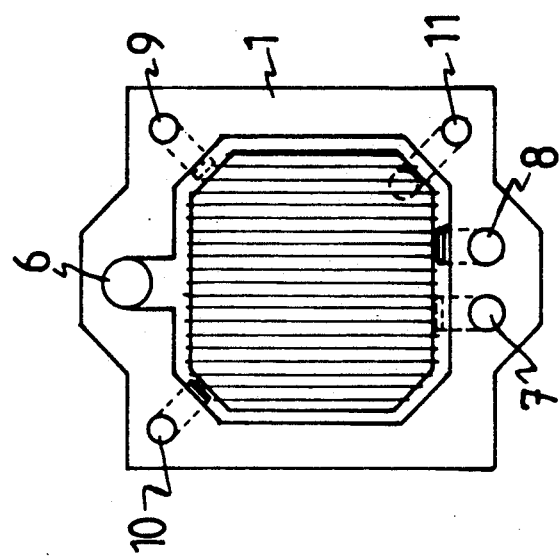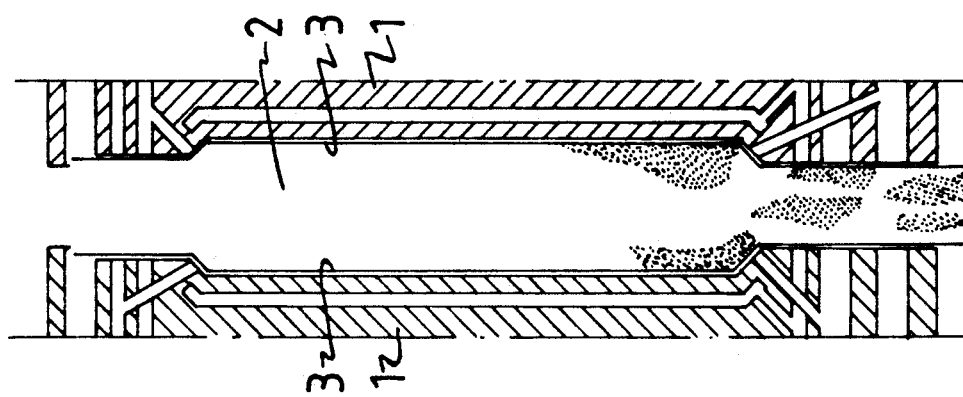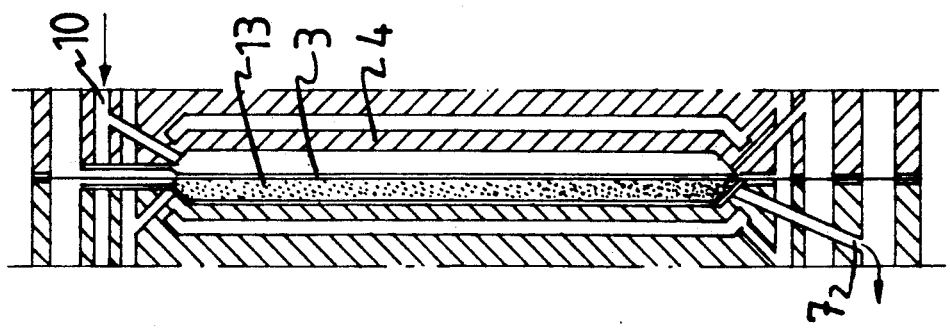

FILTERING PROCEDURE USING A BOX FILTER AND REMOVING CAKE THEREFROM

This is a continuation of International Application PCT/FI89/00132, which designated the United States, and had an International filing date of Jul. 7, 1989, now abandoned as to the United States.

BACKGROUND OF THE INVENTION

The present invention relates to a filtering procedure in which the sludge to be filtered is passed into a filtering space between two opposite filter cloths or equivalent of a box filter, and in which the cake of solid matter produced after the separation of fluid is dried by passing a stream of air through it, whereupon the cake is removed from the filtering space.

Box filters are industrially used for the separation of solid materials from fluids. Such materials include e.g. cement, mineral coal and ore concentrates. Box filters are also used for the separation of solid matter from the sludge in sewage disposal plants.

The box filter consists of a number of vertical filter plates forming a block inside which the filtering spaces are enclosed between adjacent plates, each filtering space being delimited by a filter cloth at least on one side of the space. The sludge to be filtered is supplied into the filtering space, where, in order to separate the filtrate, it is subjected to a pressure applied by a pressure medium, e.g. air, supplied into a space behind a separate pressing membrane. After this, the sludge cake thus produced can, if necessary, be washed by means of a washing fluid which is supplied into the filtering space and removed by applying a pressure again. The sludge cake can also be dried by blowing a stream of air, preferably compressed air, through the filtering space. Finally, on completion of the desired treatment of the sludge cake, the filtering space is opened for removal of the cake.

A problem in the use of box filters is that the cake of solid matter formed in the filtering space tends to stick fast to the filter cloth so that it does not fall down from the filtering space when the filter is opened. For this reason, the filtering spaces are opened separately and the filter plates are manually shaken to detach the cake. However, this means that removing the cake takes up a considerable portion of the total time of the filtering cycle. In addition, the procedure requires one person to take care that the cakes are removed from the filter.

Automatic systems for cake removal have also been developed. Their operation is based on the application of vibration to the filter cloths or on the use of detaching instruments, e.g. scrapers or nozzles for compressed air. In these systems, too, generally only one filtering space is treated at a time, but an earlier FI patent application 875030 filed by the present applicant proposes an apparatus for removal of the sludge cake using scrapers and jets of compressed air, which allows simultaneous treatment of all the filtering spaces.

Due to the problems associated with the detaching of the sludge cake from the filter cloth, the filter cloth has in some cases been chosen in the first place with a view to its properties regarding detachment of the cake. However, a cloth thus selected is seldom the best possible choice in respect of its filtering properties.

SUMMARY OF THE INVENTION

The object of the present invention is to create a new and more effiecient solution for the detaching of the cake of solid matter from a box filter. The invention is characterized in that the cake is dried in the filtering space by passing a stream of air into the cake first from one side and then from the opposite side of the filtering space in such manner that the air flows in opposite directions through the cake during these drying phases and, penetrating through the filter cloth into the cake, at the same time detaches the cake from the cloth, allowing it to be subsequently removed.

An essential advantage provided by the invention is that the cake of solid matter can be removed from the filter without introducing any detaching instruments, such as scrapers or nozzles for compressed air, into the filtering space after it has been opened. Thus, a simple box filter construction is maintained. Moreover, the solution of the invention is highly advantageous in view of automatization of the filtering process, allowing the filtering capacity to be increased while at the same time reducing the need for supervision of the process.

The invention is suited for application in box filters in which the filtering space is delimited on either side by a fixed filter cloth. In such filters, behind each filter cloth there is a separate pressing membrane, and the drying air is supplied into the space between the cloth and the membrane and further through the cloth into the sludge cake alternately from either side of the filtering space. In this manner, the cake is detached from the filter cloth first on one side and then on the opposite side of the cake.

Alternatively, the invention can also be applied in box filters in which the filtering space is delimited on one side by a filter cloth and on the other by a pressing membrane. When the membrane returns to its initial position after a pressing operation, a free space is formed between the membrane and the sludge cake, so that a stream of drying air can be passed into or out of the cake through this space. The cake is detached from the filter cloth by passing streams of air through it in opposite directions as explained above.

If necessary, the above-mentioned drying phases may be followed by one or more similar phases, during which air is passed through the cake in a direction opposite to the direction of the air flow in the previous drying phase.

BRIEF DESCRIPTION OF THE DRAWING

In the following, the invention is described by the aid of an example with reference to the drawings attached, in which FIGS. 1–5 illustrate successive stages of the filtering process in a box filter.

FIG. 6 shows a magnified view of the filter cloth delimiting the filtering space, and of the membrane behind it.

FIG. 7 represents a filter plate used in a box filter.

DESCRIPTION OF THE PREFERRED EMBODIMENTS

Figure 1:
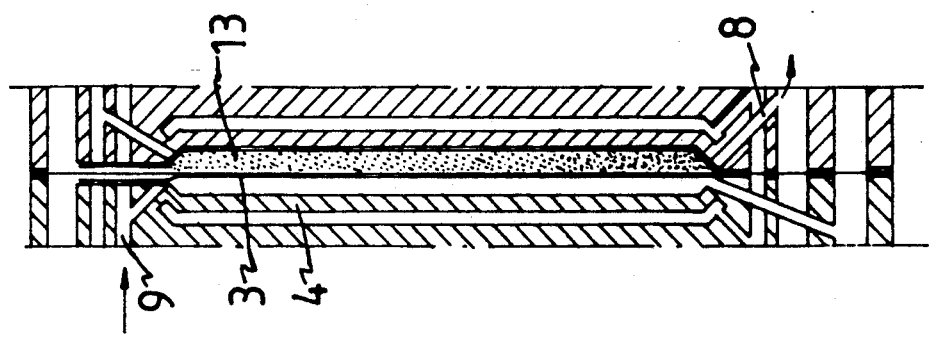

The filtering process illustrated by FIGS. 1–5 takes place in a box filter consisting of a block of vertical filter plates as shown in FIG. 7. The spaces between the vertical plates constitute the filtering spaces 2 into which the sludge to be filtered is supplied. Each filtering space 2 is delimited on either side by a filter cloth 3, behind which is a flexible pressing membrane 4. The surface of the pressing membrane 4 is provided with protrusion 5 as shown in FIG. 6, enabling the drying air and the liquid separated from the sludge to flow between the filter cloth and the pressing membrane. Communicating with the filtering spaces 2 are channels 6–10 for the supply of sludge and possible washing fluid into the filtering spaces, for the removal of the washing fluid and the liquid separated from the sludge, and for the supply of the drying air blown through the cakes of solid matter formed in the filter. In addition, the filter has channels 11 for the supply of a pressure medium into the spaces 12 provided behind the pressing membranes 4.

Figure 2:
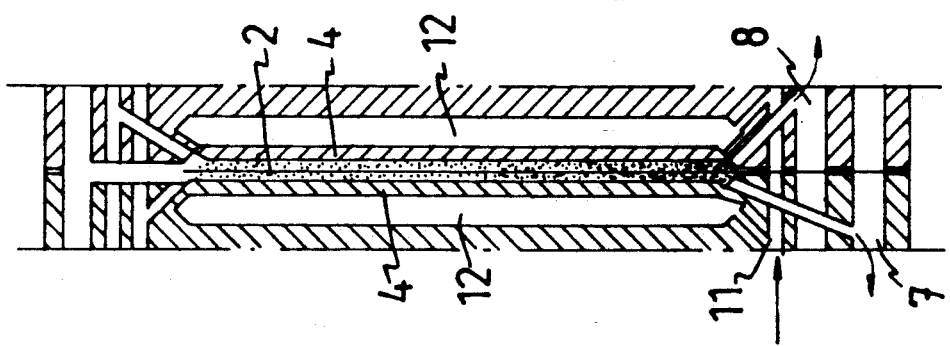
Figure 3:
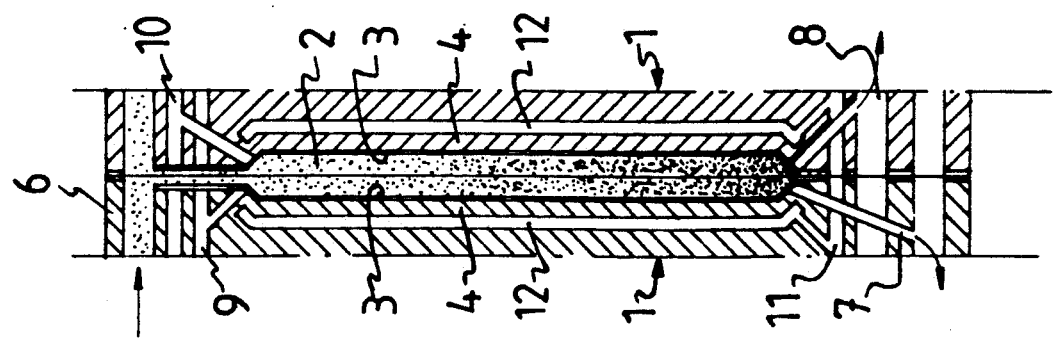

In the first phase of the filtering process, the filtering space 2 is filled with sludge supplied via channel 6 as shown in FIG. 1. The liquid separated from the sludge penetrates the filter cloths 3 and is removed via channels 7 and 8. Next, the spaces 12 behind the pressing membranes 4 are pressurized by a pressure medium, e.g. compressed air, supplied via channels 11. The membranes are now pressed against the sludge in the filtering space 2 as shown in FIG. 2, so that most of the liquid contained in the sludge flows out into channels 7 and 8. The spaces 12 are then depressurized and, as illustrated by FIG. 3, compressed air is supplied from channel 9 into the space between the filter cloth 3 and the pressing membrane 4 on the left-hand side of the filtering space 2 to dry the cake 13 of solid matter formed in the filtering space. The compressed air causes the pressing membranes 4 to return to their initial position and flows through the cake 13 and is exhausted via channel 8. As it penetrates the filter cloth 3 on the entry side, i.e. on the left-hand side of the cake in FIG. 3, the compressed air also detaches the cake from the cloth. In the next phase, illustrated by FIG. 4, the sludge cake 13 is further dried by passing a stream of compressed air through the cake in a direction opposite to the direction of the air flow during the previous phase. The compressed air is now supplied from channel 10 into the space between the filter cloth 3 and the pressing membrane 4 on the right-hand side of the cake 13, from where the air flows through the cake and is exhausted via channel 7. The air flow now detaches the cake from the filter cloth 3 on the right-hand side of the cake. When the block of filter plates is opened after these drying operations, the dried cakes 13 of solid matter, which have thus been detached from the filter cloths 3, gravitate out of the filtering space as illustrated by FIG. 5 without requiring any further measures.

If the sludge cake is to be washed in connection with the filtering, it is possible to supply a stream of washing fluid into the cake either through channel 9 or channel 10, in the same way as the drying air is supplied. In connection with the washing, the cake can also be compressed by supplying a flow of a pressure medium into the spaces 12 behind the pressing membranes 4 so that the membranes are pressed against the cake, forcing the washing fluid to flow out through channels 7 and 8.

To make sure that the sludge cake 13 is detached from the filter cloths, the second air drying phase represented by FIG. 4, during which the air flows from right to left, can be followed by a third drying phase as shown in FIG. 3, during which the air is supplied via channel 9, flows through the cake from left to right and is exhausted via channel 8. These drying operations can be repeated as necessary by blowing air alternately from different sides of the cake.

It is obvious to a person skilled in the art that different embodiments of the invention are not restricted to the example described above, but that they may instead be varied within the scope of the following claims. Thus it is possible to apply the procedure in filters in which the filtering space is delimited by a filter cloth on one side and by a pressing membrane on the other side, or in filters having fixed grates instead of pressing membranes. In the latter case, instead of being compressed, the sludge is subjected to an air drying treatment directly after the separation of the liquid. It is also possible to apply the procedure in filters having horizontal instead of vertical filter plates and filtering spaces.

I claim:
1. A sludge filtering method comprising the steps:
  a. providing a filtering space between two opposed filter cloths of a box filter;
  b. filling said space with sludge, said sludge including a fluid and solid matter;
  c. separating and removing at least a portion of said fluid from said sludge, leaving said solid matter as a cake in a condition requiring drying;
  d. passing a first stream of drying gas through said cake in a first direction to reduce the fluid content of said cake;
  e. subsequently passing a second stream of drying gas through said cake in a second direction to reduce the fluid content of said cake, said first direction and said second direction being substantially opposite to each other;
  f. subsequently opening said box filter;
  g. removing said dried cake from said filtering space.

2. A method as in claim 1, wherein said first stream of gas is forced through one said filter cloth before passing through said cake, and said second stream of gas is passed through the other said filter cloth before passing through said cake, said cake being separated from said cloths by said gas streams.

3. A method as in claim 2, and further comprising the step of repeating at least one of steps d and e before step f is initiated.

4. A method as in claim 2, wherein said gas is compressed air.

5. A method as in claim 2, wherein said filtering space is opened so that the cake is exposed at least from below, whereby said cake is removed by gravity from said space.

6. A method as in claim 2, wherein said step of separating and removing includes compressing said sludge in said filtering space by application of a force on at least one said filter cloth from outside said filtering space, fluid in said sludge passing through said filtering cloths.

7. A method as in claim 1, and further comprising the step of repeating at least one of steps d and e before step f is initiated.

8. A method as in claim 7, wherein said gas is compressed air.

9. A method as in claim 7, wherein said filtering space is opened so that the cake is exposed at least from below, whereby said cake is removed by gravity from said space.

10. A method as in claim 7, wherein said step of separating and removing includes compressing said sludge in said filtering space by application of a force on at least one said filter cloth from outside said filtering space, fluid in said sludge passing through said filtering cloths.

11. A method as in claim 1, wherein said gas is compressed air.

12. A method as in claim 1, wherein said filtering space is opened so that the cake is exposed at least from below, whereby said cake is removed by gravity from said space.

13. A method as in claim 12, wherein said step of separating and removing includes compressing said sludge in said filtering space by application of a force on at least one said filter cloth from outside said filtering space, fluid in said sludge passing through said filtering cloths.

14. A method as in claim 1, wherein said step of separating and removing includes compressing said sludge in said filtering space by application of a force on at least one said filter cloth from outside said filtering space, fluid in said sludge passing through said filtering cloths.

* * * * *